United States Patent  (10) Patent No.: US 9,894,926 B2
Delavaud et al.  (45) Date of Patent: Feb. 20, 2018

(54) HOUSEHOLD APPLIANCE FOR FOOD PREPARATION, COMPRISING A FOOD INSERTION DEVICE

(71) Applicant: SEB S.A., Ecully (FR)

(72) Inventors: Fabien Delavaud, Baliros (FR); Christian Raude, Buros (FR); Nicolas Suberbie, Momeres (FR); David Ginestet, Tarbes (FR)

(73) Assignee: SEB S.A., Ecully (FR)

( * ) Notice: Subject to any disclaimer, the term of this patent is extended or adjusted under 35 U.S.C. 154(b) by 188 days.

(21) Appl. No.: 14/434,280

(22) PCT Filed: Oct. 16, 2013

(86) PCT No.: PCT/FR2013/052474
§ 371 (c)(1),
(2) Date: Apr. 8, 2015

(87) PCT Pub. No.: WO2014/060701
PCT Pub. Date: Apr. 24, 2014

(65) Prior Publication Data
US 2015/0264972 A1 Sep. 24, 2015

(30) Foreign Application Priority Data

Oct. 18, 2012 (FR) .................................... 12 59959

(51) Int. Cl.
*A23N 1/02* (2006.01)
*A47J 43/07* (2006.01)
(52) U.S. Cl.
CPC ............ *A23N 1/02* (2013.01); *A47J 43/0716* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,954,154 A | * | 4/1934 | Urquhart | A62C 5/002 169/15 |
| 4,106,401 A | * | 8/1978 | Ackeret | A47J 19/022 99/506 |
| 4,183,293 A | * | 1/1980 | Arao | A47J 19/027 99/512 |
| 5,784,954 A | * | 7/1998 | Kokot | A47J 19/027 241/37.5 |
| 6,065,861 A | * | 5/2000 | Chen | A47J 27/004 241/69 |
| 6,796,220 B2 | * | 9/2004 | Lee | A23C 11/103 366/146 |

(Continued)

FOREIGN PATENT DOCUMENTS

DE  19702921 C1  10/1998
DE  202007000809 U1  6/2007

(Continued)

*Primary Examiner* — Anne M Antonucci
*Assistant Examiner* — Renee LaRose
(74) *Attorney, Agent, or Firm* — The Webb Law Firm

(57) ABSTRACT

Provided is a household appliance for food preparation, comprising a working body having a cover, and a working tool arranged in the working body, the cover comprising at least two spouts for inserting food into the working body. The cover comprises an upper collector leading into at least two of the spouts.

21 Claims, 10 Drawing Sheets

(56) References Cited

U.S. PATENT DOCUMENTS

| | | | |
|---|---|---|---|
| D555,434 S * | 11/2007 | Cohen | D7/665 |
| 7,587,974 B2 * | 9/2009 | Cohen | A47J 43/0716 426/231 |
| D620,313 S * | 7/2010 | Lin | D7/384 |
| D643,265 S * | 8/2011 | Kim | D7/665 |
| D668,120 S * | 10/2012 | Pichler | D7/665 |
| 8,807,022 B2 * | 8/2014 | Backus | A47J 19/027 99/510 |
| D739,679 S * | 9/2015 | Benoit | D7/376 |
| D743,737 S * | 11/2015 | Benoit | D7/376 |
| 2006/0124536 A1 * | 6/2006 | Guerrero | A47J 43/0716 210/473 |
| 2007/0277682 A1 * | 12/2007 | Wong | A47J 19/025 99/495 |
| 2008/0210796 A1 * | 9/2008 | Cozzolino | A47J 43/0761 241/282.1 |

FOREIGN PATENT DOCUMENTS

| | | |
|---|---|---|
| DE | 102010026974 A1 | 1/2012 |
| FR | 2967035 A1 | 5/2012 |

\* cited by examiner

HOUSEHOLD APPLIANCE FOR FOOD PREPARATION, COMPRISING A FOOD INSERTION DEVICE

CROSS-REFERENCE TO RELATED APPLICATIONS

This application is the United States national phase of International Application No. PCT/FR2013/052474 filed Oct. 16, 2013, and claims priority to French Patent Application No. 1259959 filed Oct. 18, 2012, the disclosures of which are hereby incorporated in their entirety by reference.

Field of the Invention

The present invention relates to the technical field of electrical household appliances for food preparation, comprising a working body with a food insertion device, said working body housing a working tool for processing the inserted food.

The present invention relates in particular, but not exclusively, to electrical household appliances for food preparation comprising a working body with an outlet for processed food, which allows continuous operation.

The present invention relates in particular to appliances for pressing, grating, mincing, slicing, and grinding foods such as presses, juicers, vegetable cutters, graters, grinders, and multifunctional robots.

Description of Related Art

Document DE102010026974 discloses an appliance for food preparation comprising a working tool positioned in a working body comprising a cover with several spouts for inserting food into the working body. The spouts have different cross-sections and heights. These arrangements make it possible to provide several options for the insertion of food into the working body. However, these arrangements are adapted more for elongate food items of a height greater than the cross-section of the spout.

An object of the present invention is to facilitate the insertion of small-sized food items into the working body of an electrical household appliance for food preparation.

Another object of the present invention is to improve the rate at which food is inserted into the working body of an electrical household appliance for food preparation.

SUMMARY OF THE INVENTION

These objects are achieved with an electrical household appliance for food preparation comprising a working body having a cover and a working tool positioned in the working body, the cover having at least two spouts for inserting food into the working body, wherein the cover comprises an upper collector leading into at least two of the spouts. The cross-section of the spouts of electrical household appliances for food preparation is limited for reasons related to standards. The use of several spouts makes it possible to increase the rate at which food is inserted into the working body. The use of an upper collector according to the invention facilitates the distribution of food into the various spouts, in particular for food pieces or small-sized food items.

The upper collector advantageously has at least one upper edge portion for containing food. As a supplement or an alternative, the upper collector can have a surface slanted towards the spouts.

According to an advantageous embodiment, the upper collector has an annular upper rim. The annular upper rim thus surrounds the upper inlet of the spouts.

According to an advantageous embodiment, the upper collector has several openings, each opening leading into one of the spouts. As an alternative, the upper collector could in particular have at least one opening leading into at least two of the spouts.

According to a preferred embodiment, the cover has at least three spouts arranged about a rotational axis of the working tool. The center part of the cover is of less importance for the insertion of food because the linear velocity of the working tool is less there than at the periphery. Preference is given to the cover having between three and six spouts arranged about a rotational axis of the working tool.

Advantageously then, the cover comprises a guide element for receiving an upper end of the working tool centered along the rotational axis, said guide element being surrounded by the spouts. This arrangement makes it possible to obtain a functional appliance without affecting the supplying of the working body.

According to an advantageous embodiment, the appliance comprises a plunger for pushing the food into each of the spouts. The same plunger can thus be used successively with the different spouts. The spouts then preferably have identical inside cross-sections.

The spouts advantageously have a non-circular inside cross-section. This arrangement makes it possible to prevent the plunger from rotating in the spout.

According to an advantageous embodiment, the spouts are formed in a common piece. This arrangement helps reinforce the sturdiness of the cover.

According to an advantageous embodiment, the upper collector is mounted on the spouts. In other words, the upper collector and the spouts are formed from different pieces. This arrangement simplifies the manufacturing of the cover. The upper collector can optionally be detachable from the spouts, or on the other hand it can be fastened to the spouts.

According to an advantageous embodiment, the working body is positioned on a motorized housing with a drive output for driving the working tool positioned in the working body in rotation. This arrangement makes it possible to free up the surface of the cover.

According to a remarkable embodiment, the working tool forms a rotatably driven pressing screw and the working body comprises a filter element delimiting a first compartment housing the pressing screw and a second compartment for collecting at least a portion of the food processed by the pressing screw. In particular, it is possible to extract juice from small fruits or fruit pieces after the cores have been removed.

The insertion of such food into the appliance can be tedious, and the upper collector therefore makes it possible to use a significant quantity of food by introducing it gradually into the working body at the desired pace.

Advantageously then, the pressing screw is surrounded by the filter element. This arrangement makes it easier to obtain a high flow rate of the pressed food.

According to a preferred embodiment, the pressing screw has two main threads defining two separate passages for the food inserted into the working body via the spouts. This arrangement enables the forces to be more evenly distributed around the pressing screw and likewise helps in obtaining a high flow rate of the pressed food.

Advantageously still, the working body comprises at least one outlet for discharging at least a portion of the food processed by the working tool. The working body can optionally comprise a first outlet for the juice and a second outlet for the pressing residue.

Another object of the present invention is to propose an electrical household appliance for food preparation comprising a working body housing a pressing screw, wherein the motorization is adapted for improving the rate at which the food is inserted into the working body.

This object is achieved with an electrical household appliance for food preparation comprising a working body positioned on a motorized housing with a drive output for driving the working tool positioned in the working body in rotation, the working tool forming a rotatably driven pressing screw and the working body comprising a filter element delimiting a first compartment housing the pressing screw and a second compartment for collecting at least a portion of the food processed by the pressing screw, the motorized housing holding an electric motor connected to the drive output by means of a transmission device, wherein the transmission device comprises a two-stage epicyclic reducer having a first stage driven by the electric motor, a second stage driven by the first stage, the second stage driving the drive output. With this arrangement, it is possible to obtain a screw press-type electrical household appliance for food preparation comprising a sturdy and compact reducer.

According to a preferred embodiment, the first stage has at least one first pinion cooperating with a first drive axis mounted on an output shaft of the electric motor on the one hand and with a first toothed inner wall of a first housing element on the other, the first pinion being mounted so that it can rotate freely on a first rotary support having a first output axis coaxial with the output shaft of the electric motor, wherein the second stage comprises at least one second pinion cooperating with a second drive axis mounted on the first output axis on the one hand and with a second toothed inner wall of a second housing element on the other, the second pinion being mounted so that it can rotate freely on a second rotary support having a second output axis coaxial with the first output axis, the second output axis forming the drive output.

The working chamber can optionally have a cover with at least one spout for inserting food into the working body. The working body preferably has a cover with at least two spouts for inserting food into the working body.

BRIEF DESCRIPTION OF THE DRAWINGS

The invention will be more clearly understood by studying an exemplary embodiment and an alternate embodiment, which are in no way limiting and which are illustrated in the appended figures, wherein.

DETAILED DESCRIPTION OF THE INVENTION

Figure 8:
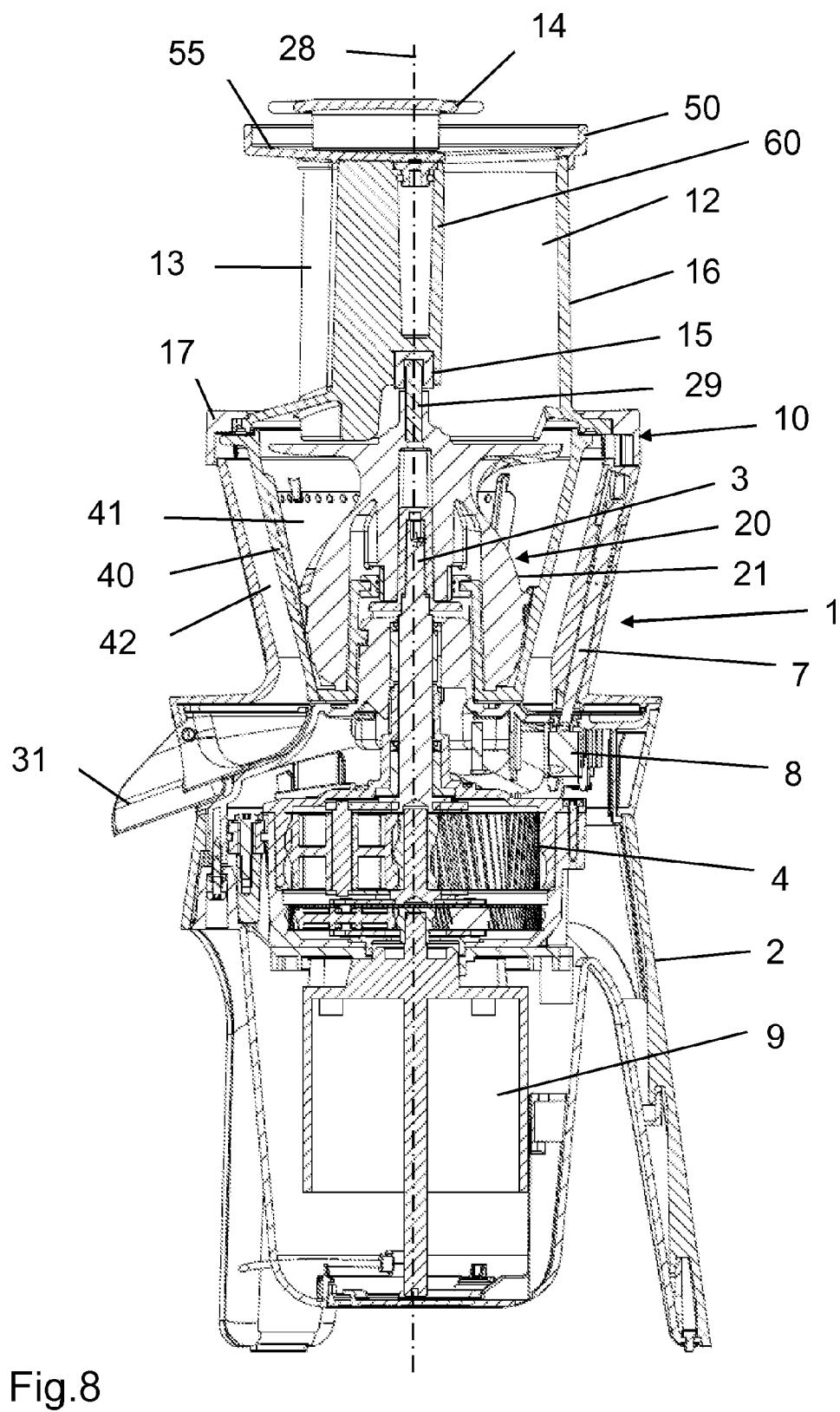
FIG. 8 is a vertical cutaway view of the electrical household appliance for food preparation illustrated in FIGS. 1 through 6.

The electrical household appliance for food preparation illustrated in FIGS. 1 through 6 and in FIG. 8 is a juice extractor comprising a working body 1 having a cover 10 with at least two spouts 11, 12, 13 for inserting food into the working body.

The electrical household appliance for food preparation illustrated in FIGS. 1 through 6 and in FIG. 8 comprises a plunger 14 for pushing the food into each of the spouts 11, 12, 13. The spouts 11, 12, 13 advantageously have identical inside cross-sections. Preference is given to each of the spouts 11, 12, 13 having a non-circular inside cross-section in order to prevent the plunger 14 from rotating in the spouts 11, 12, 13. As is readily visible in FIGS. 8, 9, and 10, the cover 10 comprises a central core 60 extending to the inside of each of the spouts 11, 12, 13. The spouts 11, 12, 13 are arranged around the central core 60. The inside cross-section of the spouts 11, 12, 13 is essentially circular, the inside cross-section of the spouts 11, 12, 13 being circular outside the central core 60.

As can be discerned in FIG. 8, a working tool 20 is positioned in the working body 1. More particularly in the exemplary embodiment illustrated in FIGS. 1 through 10, the working body 1 is positioned on a motorized housing 2 with a drive output 3 for driving the working tool 20 positioned in the working body 1 in rotation. The motorized housing 2 forms a base on which the working body 1 rests. The motorized housing 2 holds an electric motor 9, which is illustrated schematically. The electric motor 9 is connected to the drive output, optionally by means of a transmission device 4.

As is readily visible in FIG. 8, the transmission device 4 comprises a two-stage epicyclic reducer 70 having a first stage 71 driven by the electric motor 9, a second stage 72 driven by the first stage 71, the second stage 72 driving the drive output 3.

Figure 11:
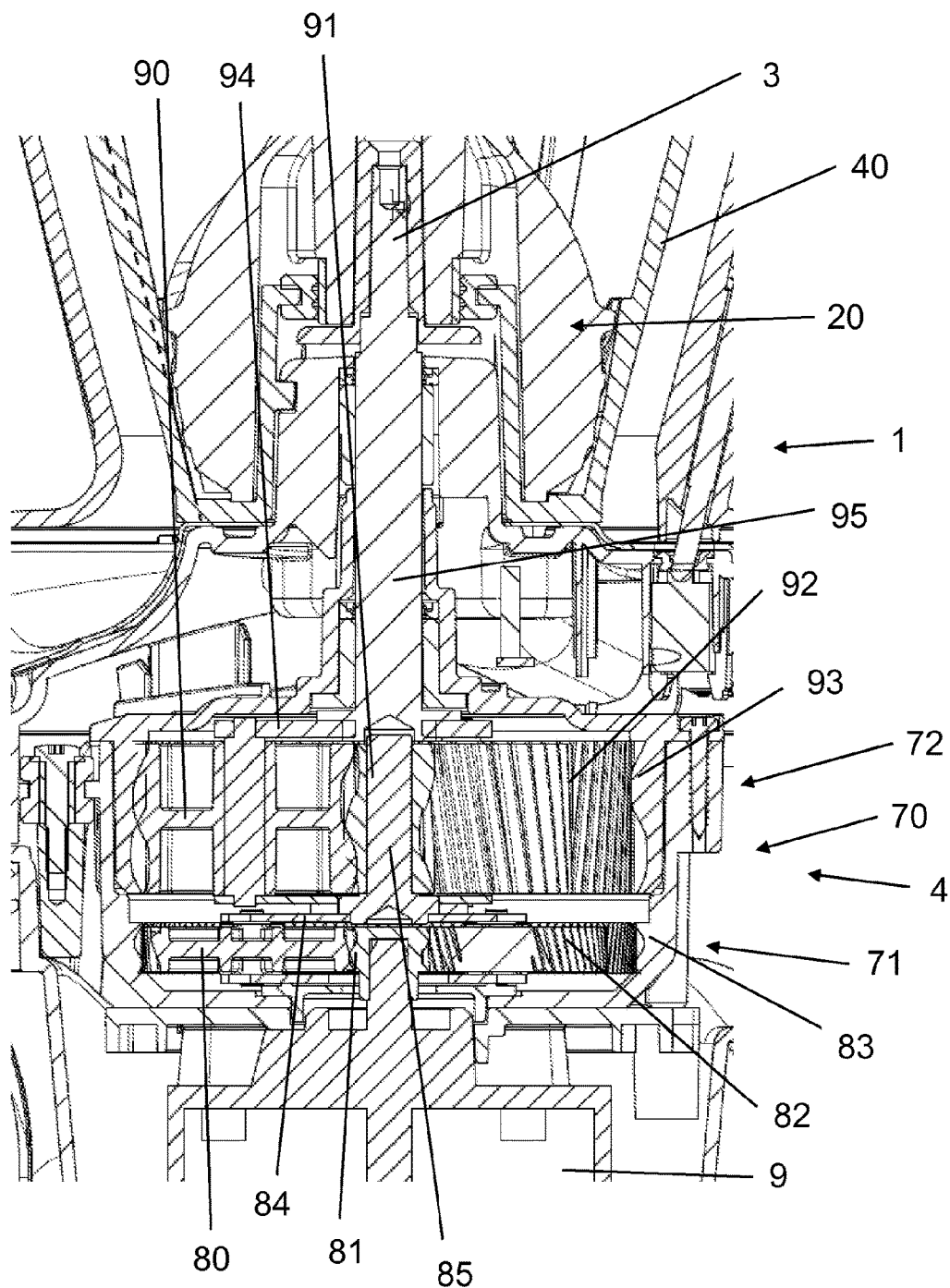
FIG. 11 is a magnified view of a portion of FIG. 8.

As is more readily discernible in FIG. 11, the first stage 71 comprises at least one first pinion 80 cooperating with a first drive axis 81 mounted on an output shaft of the electric motor 9 on the one hand, and with a first toothed inner wall 82 of a first housing element 83 on the other. The first pinion 80 is mounted so that it can rotate freely on a first rotary support 84 having a first output axis 85 coaxial with the output shaft of the electric motor 9. The second stage 72 comprises at least one second pinion 90 cooperating with a second drive axis 91 mounted on the first output axis 85 on the one hand and with a second toothed inner wall 92 of a second housing element 93 on the other. The second pinion 90 is mounted so that it can rotate freely on a second rotary support 94 having a second output axis 95 coaxial with the first output axis 85. The second output axis 95 forms the drive output 3.

Figure 1:
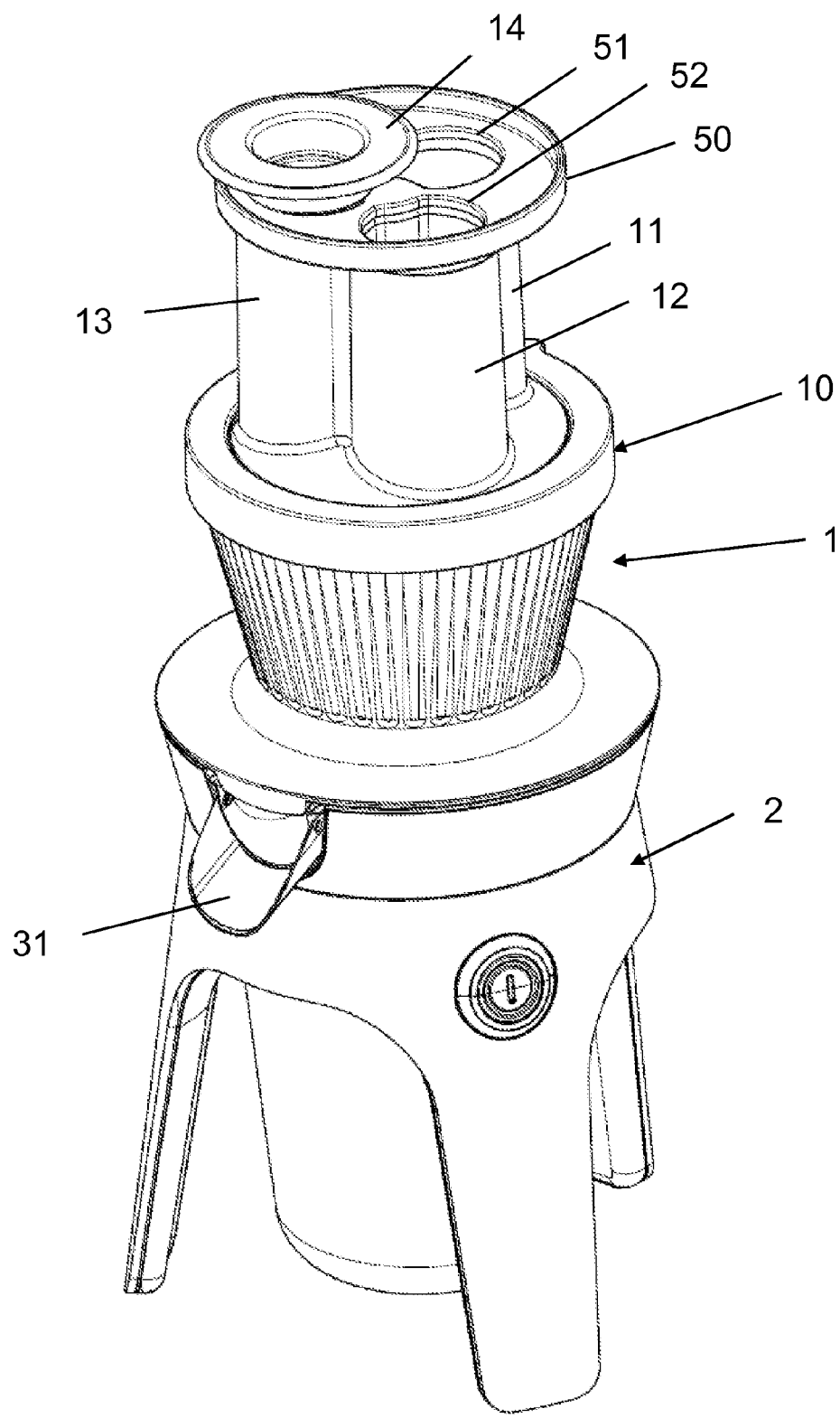
FIG. 1 illustrates an example of an electrical household appliance for food preparation according to the invention, shown in elevation.
Figure 2:
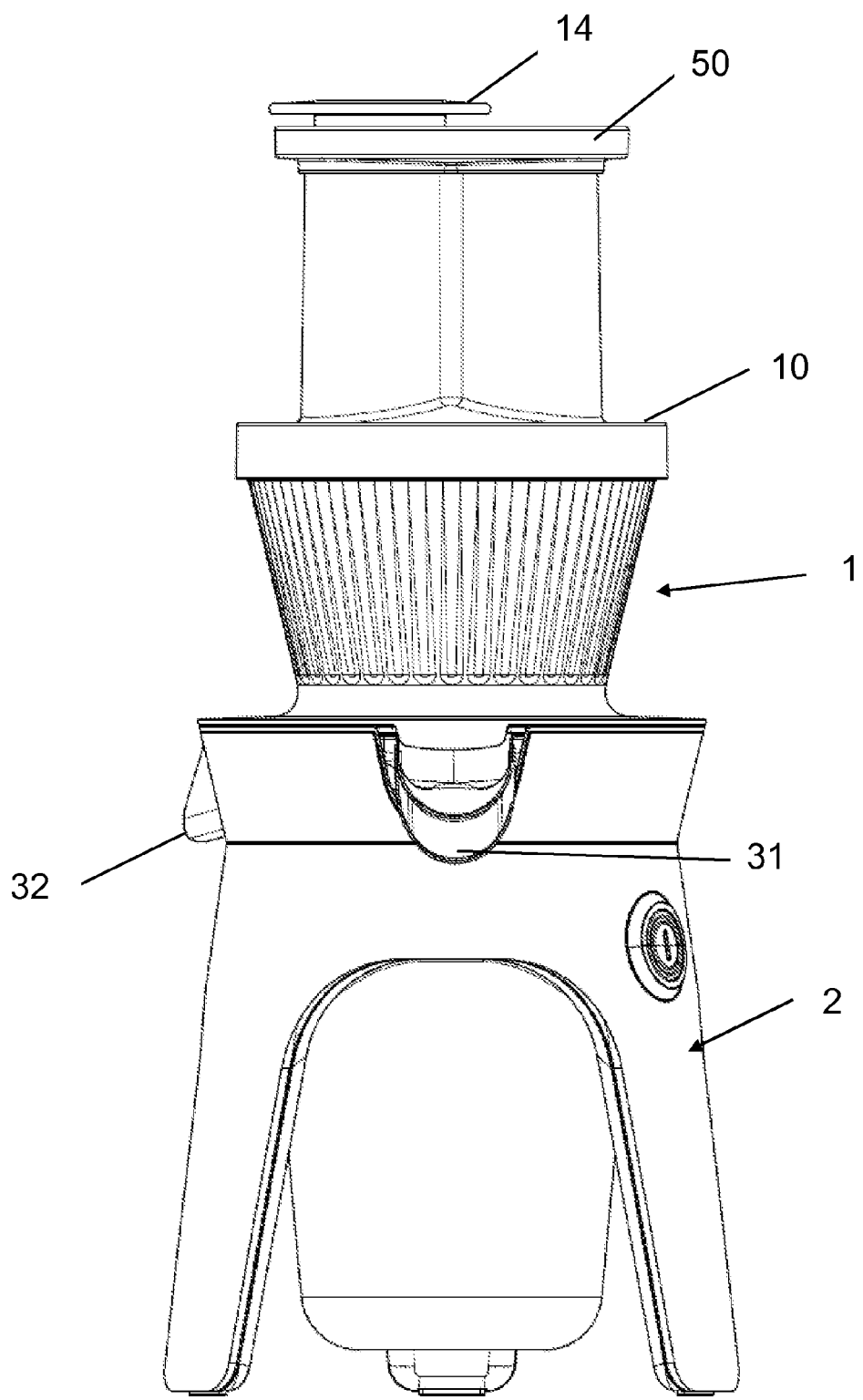
FIG. 2 is a side view of the electrical household appliance for food preparation illustrated in FIG. 1.
Figure 3:
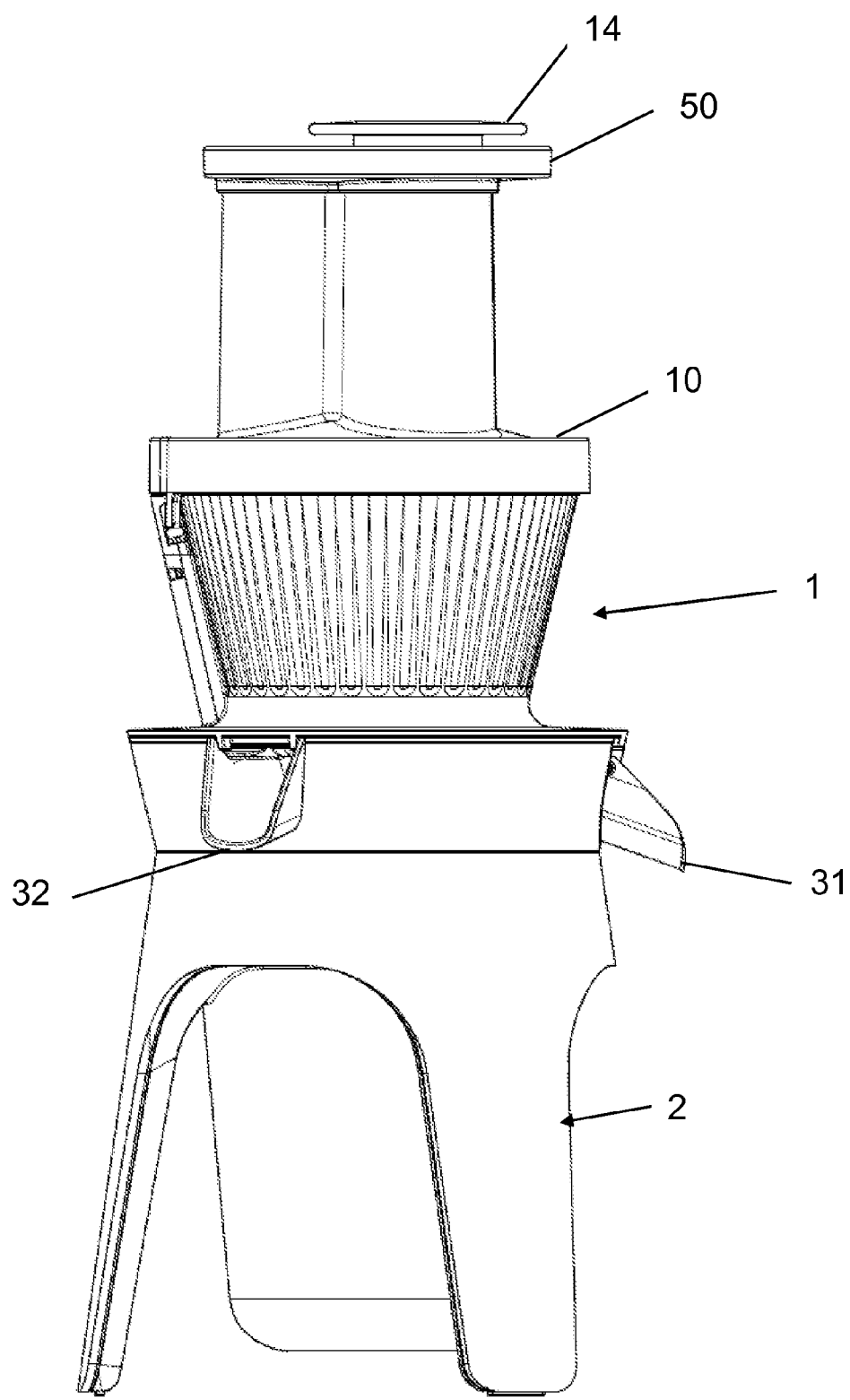
FIG. 3 is a right-hand view of the electrical household appliance for food preparation illustrated in FIGS. 1 and 2.
Figure 4:
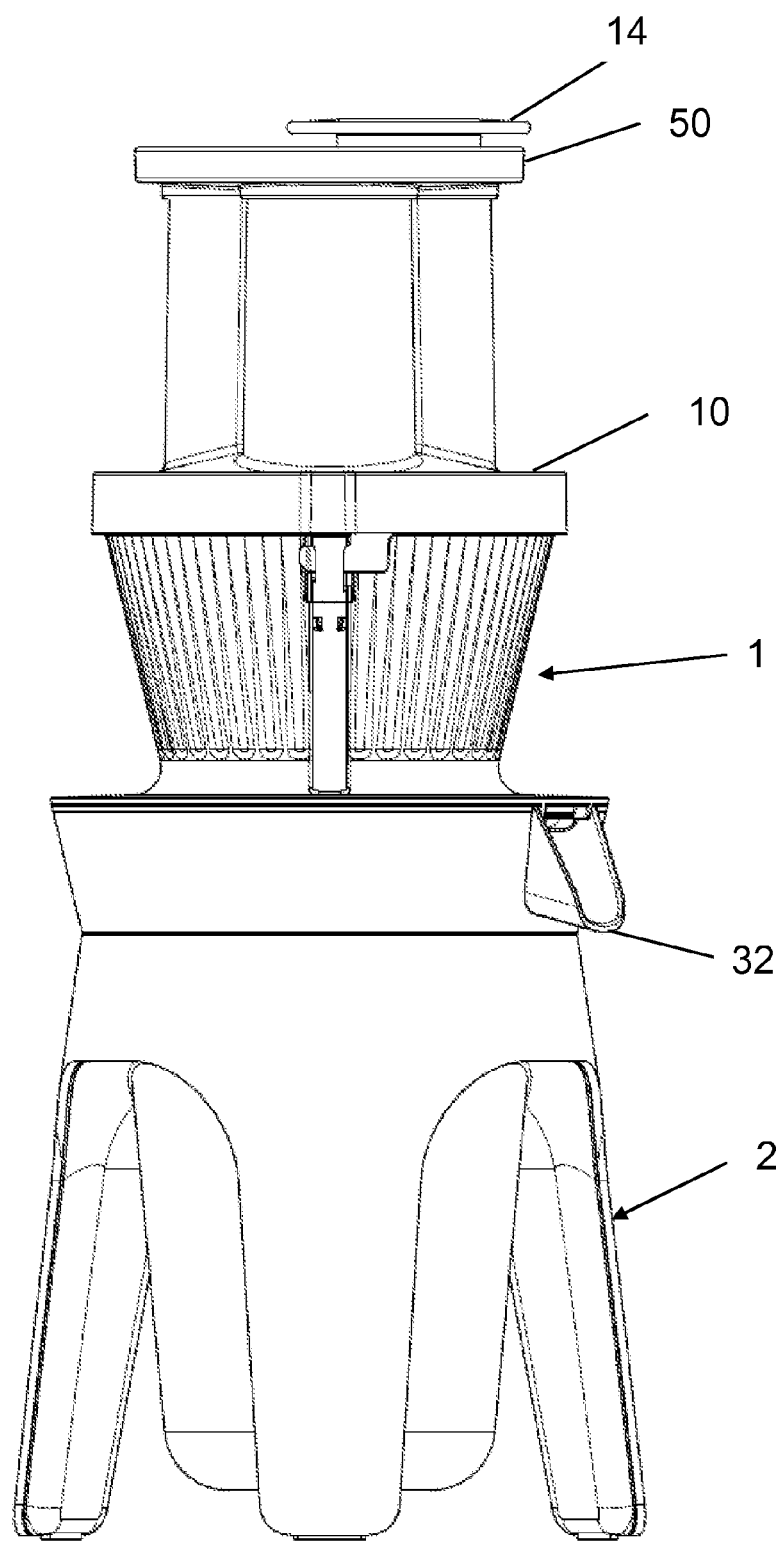
FIG. 4 is a rear view of the electrical household appliance for food preparation illustrated in FIGS. 1 through 3.
Figure 5:
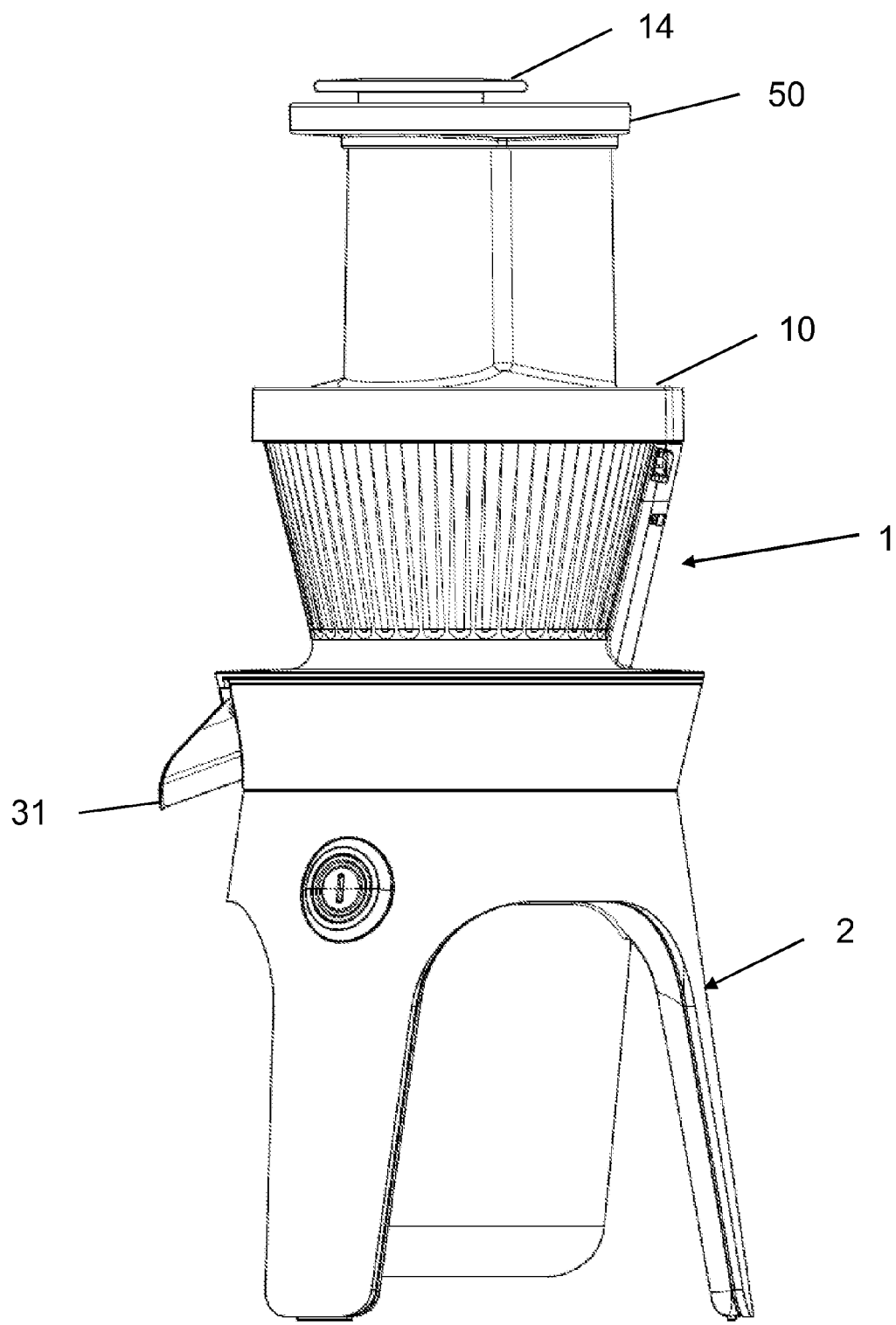
FIG. 5 is a left-hand view of the electrical household appliance for food preparation illustrated in FIGS. 1 through 4.
Figure 6:
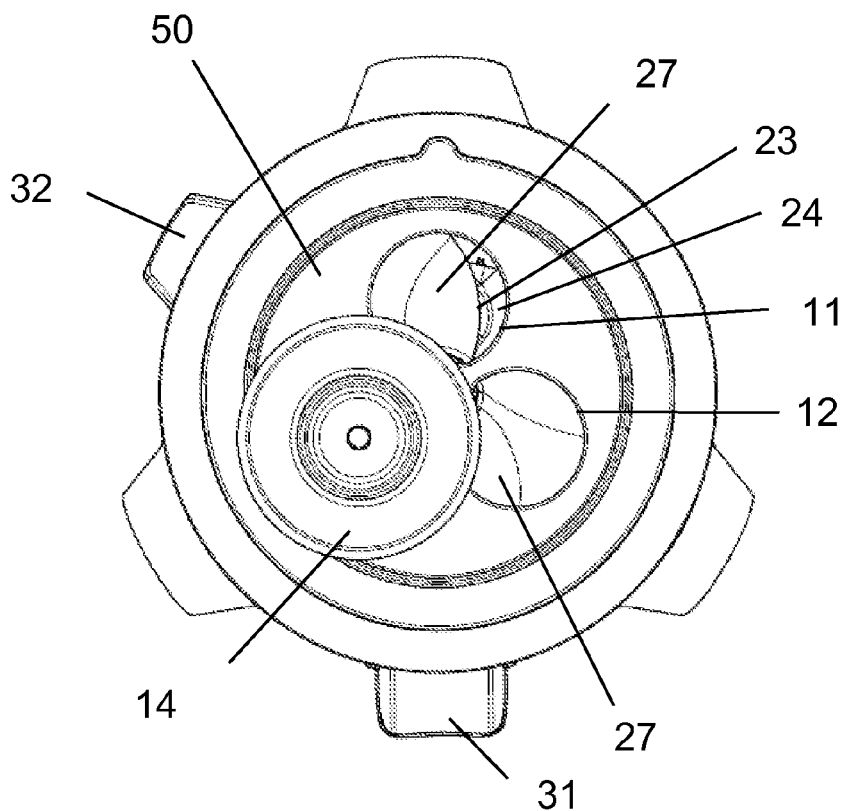
FIG. 6 is a view from above of the electrical household appliance for food preparation illustrated in FIGS. 1 through 5.
Figure 7:
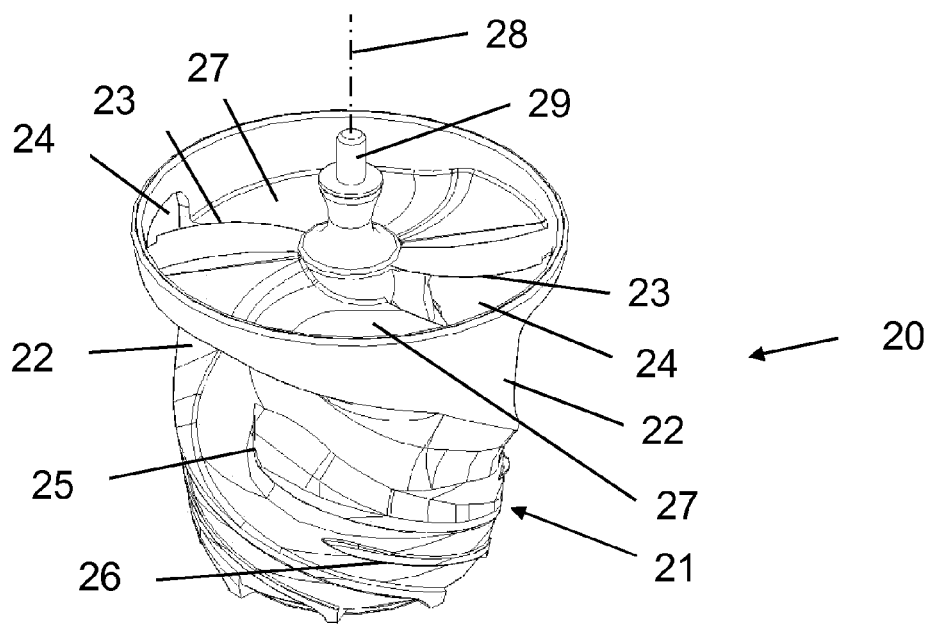
FIG. 7 is a perspective view of a working tool of the electrical household appliance for food preparation illustrated in FIGS. 1 through 6.

As is more readily visible in FIG. 7, the working tool 20 forms a pressing screw 21. The pressing screw 21 advantageously has two main threads 22 which each comprise an upper cutting end 23. The two main threads 22 define two separate passages 24 for the food inserted into the working body via the spouts 11, 12, 13. Secondary threads 26 can be interposed between the main threads 22. The upper portion of each main thread 22 forms a bearing surface 27 for bearing the food inserted via one of the spouts 11, 12, 13 prior to the cutting of said food by the adjacent upper cutting end 23. As can be discerned in FIG. 6, the bearing surfaces 27 are arranged facing the conduits formed by the spouts 11, 12, 13.

More particularly in the exemplary embodiment illustrated in FIGS. 1 through 10, the working body comprises a filter element 40 delimiting a first compartment 41 housing the pressing screw 21 and a second compartment 42 for collecting at least a portion of the food processed by the pressing screw 21. The pressing screw 21 driven in rotation in the working body 1 presses the food against the filter element 40 in order to extract the juice, which can then flow into the second compartment 42. In the preferred embodiment illustrated in FIGS. 1 through 10, the pressing screw 21 is surrounded by the filter element 40.

The working body 1 advantageously comprises at least one outlet 31, 32 for discharging at least a portion of the food processed by the working tool 20. In the exemplary embodiment illustrated in FIGS. 1 through 10, the outlet 31 communicates with the second compartment 42 for discharging the juice; the other outlet 32 communicates with the first compartment 41 for discharging the residue.

According to a feature of the invention, the cover 10 comprises an upper collector 50 leading into at least two of the spouts 11, 12, 13. In other words, the upper collector 50 forms a food collection device that is common to at least two spouts. The user can thus put food and/or food pieces on the upper collector 50 without necessarily choosing the spout or spouts used to insert the food into the working body 1. The upper collector 50 preferably leads into all of the spouts 11, 12, 13. As is more readily visible in FIG. 9, the upper collector 50 has several openings 51, 52, 53 and each opening 51, 52, 53 leads into one of the spouts 11, 12, 13. As an alternative, the upper collector could have at least one opening common to several spouts.

According to a preferred embodiment, the cover 10 has at least three spouts 11, 12, 13 arranged about a rotational axis 28 of the working tool 20. As can be seen in FIG. 8, the cover 10 comprises a guide element 15 for receiving an upper end 29 of the working tool 20 centered along the rotational axis 28. As is more readily visible in FIG. 10, said guide element 15 is surrounded by the spouts 11, 12, 13.

In the exemplary embodiment illustrated in FIGS. 1 through 10, the spouts 11, 12, 13 are arranged symmetrically about the rotational axis 28 of the working tool 20. The spouts 11, 12, 13 extend parallel to the rotational axis 28 of the working tool 20, as can be discerned in FIG. 8.

In the exemplary embodiment illustrated in FIGS. 1 through 10, the spouts 11, 12, 13 are formed in a common piece 16 arranged between the upper collector 50 and a ring 17 comprising locking elements 18 as well as a safety element 19 for pushing a control rod 7 that actuates a switch 8 for supplying power to the electric motor 9 that drives the drive output 3 when the cover 10 is correctly locked.

In the exemplary embodiment illustrated in FIGS. 1 through 10, the upper collector 50 is mounted on the spouts 11, 12, 13. The upper collector 50 can optionally be detachable from the spouts 11, 12, 13.

In the exemplary embodiment illustrated in FIGS. 1 through 10, the upper collector 50 surrounds the spouts 11, 12, 13. The upper collector 50 is circular. The upper collector 50 forms a stage 55 slightly slanted toward the spouts 11, 12, 13 in relation to the bearing plane of the appliance. Optionally, the stage 55 can in particular be flat or more slanted toward the spouts 11, 12, 13 in relation to the bearing plane of the appliance so as to form a funnel.

According to an advantageous embodiment, the upper collector 50 has at least an upper edge portion 56 for containing food. In the preferred embodiment illustrated in FIGS. 1 through 10, the upper collector 50 has an annular upper rim 57.

The appliance of the invention is used and functions in the following manner.

The user positions the working tool 20 in the working body 1 and closes the cover 10. The user can then insert food in one or another of the spouts 11, 12, 13, and/or place food on the stage 55 of the upper collector 50 for inserting it gradually into the spouts 11, 12, 13. The user is thus able to obtain a rate of insertion of food into the working chamber 1 that is suitably adapted to the rate at which the working tool 20 processes the food. The upper collector is, for example, well-suited to the use of small-sized food items or food pieces that are not handled individually.

As an alternative, the upper collector 50 can have at least three openings arranged around a guide element 15 for the upper end 29 of the rotational axis 28 of the working tool 20.

As an alternative, the cover 10 can comprise at least one cutting blade arranged in one of the spouts 11, 12, 13, and/or at least one cutting blade arranged between two spouts.

Figure 9:
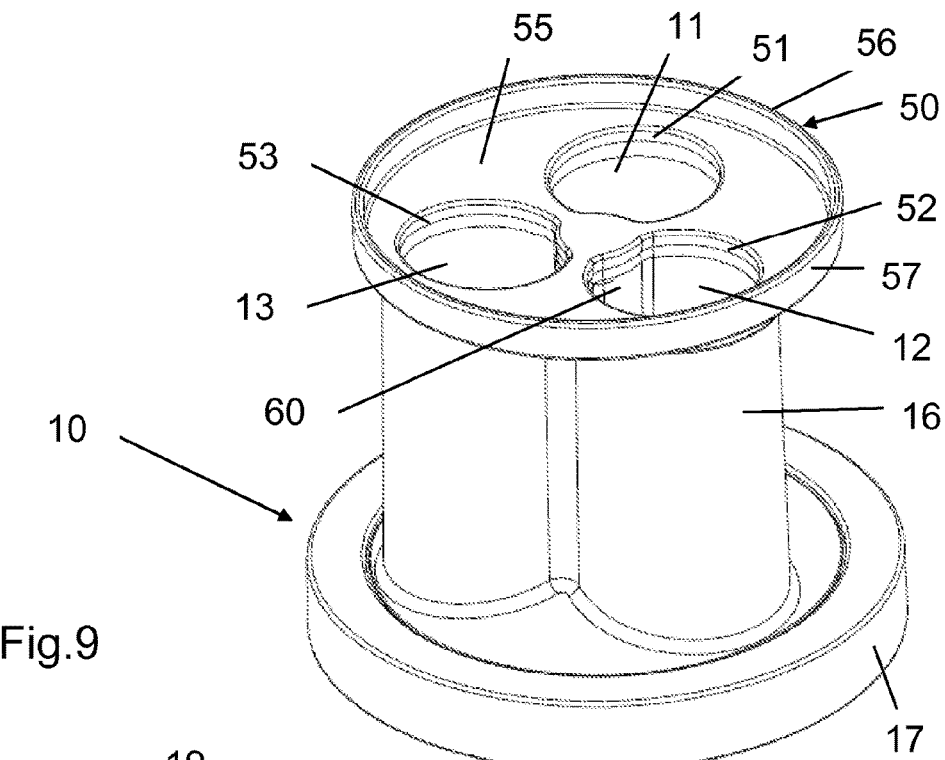
FIG. 9 is a perspective view from above of the cover of the appliance illustrated in FIGS. 1 through 6 and in FIG. 8.
Figure 10:
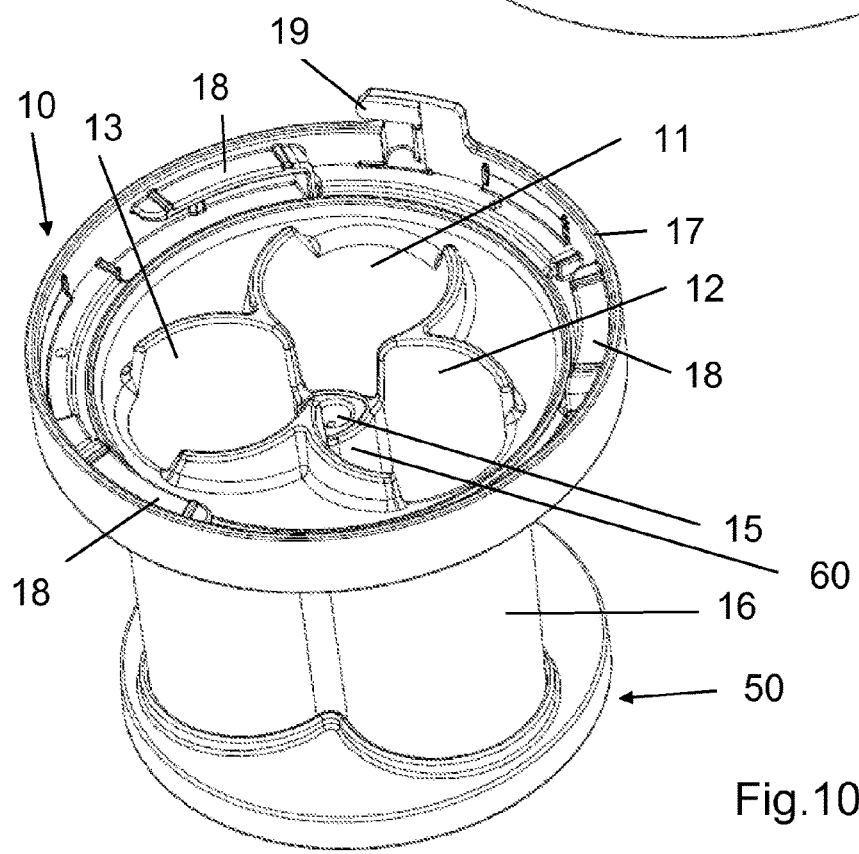
FIG. 10 is a perspective view from below of the appliance illustrated in FIGS. 1 through 6 and in FIG. 8.
Figure 12:
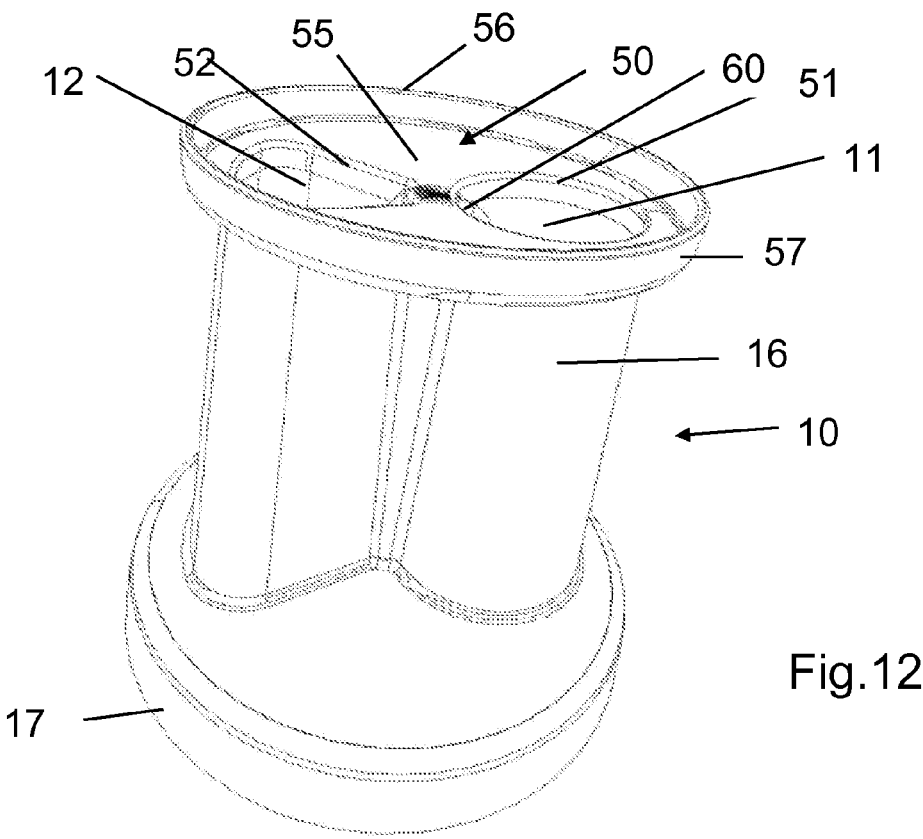
FIG. 12 is a perspective view from above of an alternative embodiment of a cover belonging to an electrical household appliance for food preparation of the invention.
Figure 13:
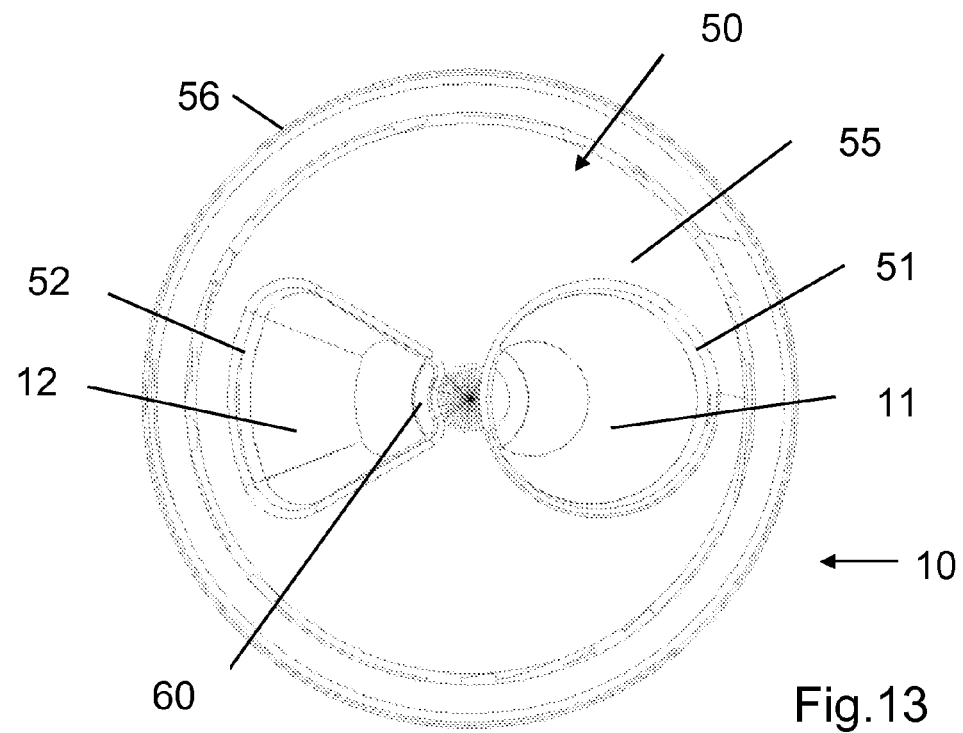
FIG. 13 is another perspective view from above of the cover illustrated in FIG. 12.

The cover 10 illustrated in FIGS. 12 and 13 differs from the cover 10 illustrated in FIGS. 1 through 6 and in FIGS. 8 through 10 in that it comprises two spouts 11, 12. The upper collector 50 leads into the two spouts 11, 12. Hence each opening 51, 52 leads into one of the spouts 11, 12. In addition, the two spouts 11, 12 are arranged on either side of the axis of the cover 10 that corresponds to the rotational axis of the working tool. The spouts 11, 12 have two distinctly different geometries, the cross-section of the spout 11 being essentially circular and the cross-section of the spout 12 being essentially triangular. The cover 10 comprises a central core 60 extending to the interior of each of the spouts 11, 12. The central core 60 is arranged between the spouts 11, 12. The spouts 11, 12 are formed in a common piece 16 arranged between the upper collector 50 and a ring 17. The upper collector 50 is circular and forms a stage 55 that is preferably slightly slanted toward the spouts 11, 12 in relation to the bearing plane of the appliance to which the cover 10 belongs. The collector 50 has an upper edge 56 for containing the food and is formed by an annular upper rim 57.

The present invention is not limited in any way to the exemplary embodiments described herein, but encompasses numerous modifications in the scope of the claims.

The invention claimed is:

1. Electrical household appliance for food preparation comprising a working body having a cover and a working tool positioned in the working body, the cover having at least two spouts for inserting food into the working body, the cover comprising an upper collector, wherein the upper collector forms a food collection device that is common to at least two spouts, the upper collector leading into the at least two spouts, to facilitate repartition of the food in the spouts.

2. Electrical household appliance for food preparation as in claim 1, wherein the upper collector has at least one upper edge portion for containing food.

3. Electrical household appliance for food preparation as in claim 1, wherein the upper collector has an annular upper rim.

4. Electrical household appliance for food preparation as in claim 1, wherein the upper collector has a plurality of openings and wherein each opening leads into one of the spouts.

5. Electrical household appliance for food preparation as in claim 1, wherein the cover has at least three spouts arranged around a rotational axis of the working tool.

6. Electrical household appliance for food preparation as in claim 5, wherein the cover comprises a guide element for receiving an upper end of the working tool centered along the rotational axis, said guide element being surrounded by the spouts.

7. Electrical household appliance for food preparation as in claim 1, wherein the appliance further comprises a plunger for pushing the food into each of the spouts.

8. Electrical household appliance for food preparation as in claim 1, wherein the spouts have a non-circular inside cross-section.

9. Electrical household appliance for food preparation as in claim 1, wherein the spouts are formed in a common piece.

10. Electrical household appliance for food preparation as in claim 1, wherein the upper collector is mounted on the spouts.

11. Electrical household appliance for food preparation as in claim 1, wherein the working body is positioned on a motorized housing with a drive output for driving the working tool positioned in the working body in rotation.

12. Electrical household appliance for food preparation as in claim 1, wherein the working tool forms a pressing screw driven in rotation and wherein the working body comprises a filter element delimiting a first compartment housing the pressing screw and a second compartment for collecting at least a portion of the food processed by the pressing screw.

13. Electrical household appliance for food preparation as in claim 12, wherein the pressing screw is surrounded by the filter element.

14. Electrical household appliance for food preparation as in claim 12, wherein the pressing screw has two main threads defining two separate passages for the food inserted into the working body via the spouts.

15. Electrical household appliance for food preparation as in claim 1, wherein the working body comprises at least one outlet for discharging at least a portion of the food processed by the working tool.

16. Electrical household appliance for food preparation as in claim 14, wherein the working body comprises at least one outlet for discharging at least a portion of the food processed by the working tool.

17. Electrical household appliance for food preparation as in claim 1, wherein the upper collector surrounds the spouts.

18. Electrical household appliance for food preparation as in claim 1, wherein the upper collector has a surface slanted towards the spouts.

19. Electrical household appliance for food preparation as in claim 1, wherein the upper collector forms a stage slightly slanted towards the spouts.

20. Electrical household appliance for food preparation as in claim 1, wherein the upper collector leads into all of the spouts.

21. Electrical household appliance for food preparation as in claim 1, wherein the upper collector is detachable from the spouts.

* * * * *